Oct. 31, 1933.  R. P. SHERMAN ET AL  1,932,992
PLUNGER CONTROL DEVICE
Filed July 25, 1932
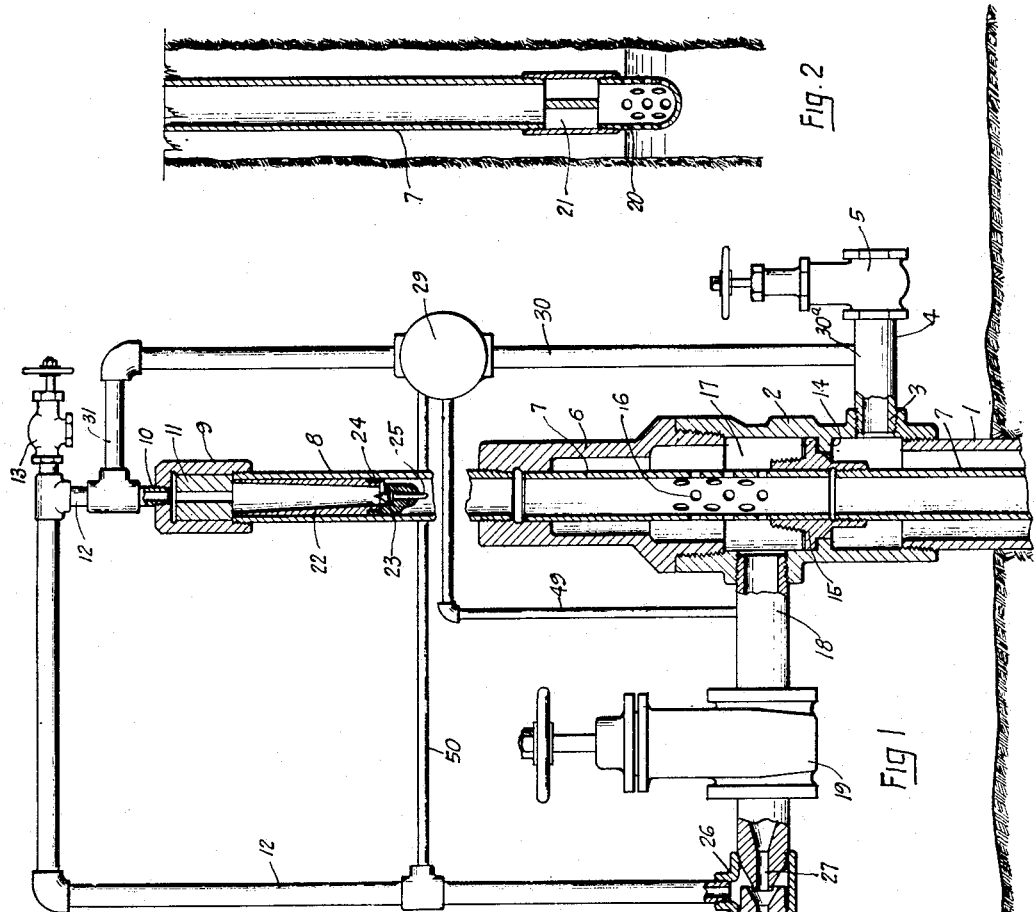
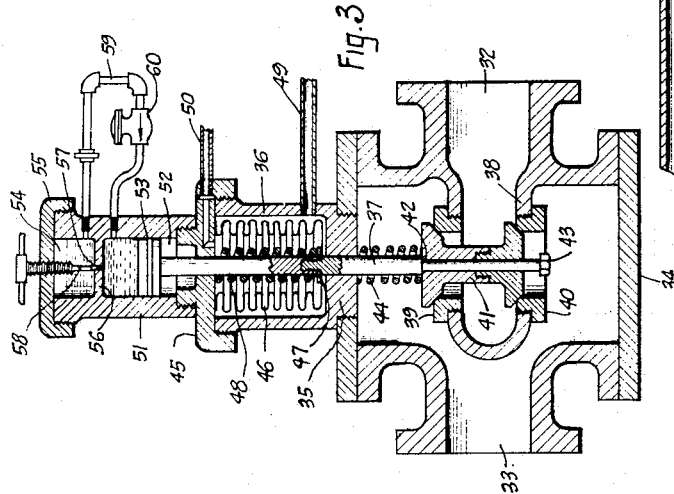
RALPH P. SHERMAN
HAROLD W. FLETCHER
INVENTORS
BY *Jesse P. Stone*
ATTORNEY Patented Oct. 31, 1933

1,932,992

UNITED STATES PATENT OFFICE 1,932,992

PLUNGER CONTROL DEVICE

Ralph P. Sherman and Harold W. Fletcher, Houston, Tex., assignors to Hughes Tool Company, Houston, Tex., a corporation of Texas Application July 25, 1932. Serial No. 624,430

9 Claims. (Cl. 103—52)

Our invention is an improvement in plunger lift devices in which liquid is raised from the well through the use of a plunger operated by gas or air.

It is an object of this invention to provide means to control the operation of the plunger and retain it at the upper end of the tubing extension while the gas pressure is exhausting from the eduction tube at the end of each stroke of the plunger.

We desire to prevent the dropping of the plunger until after the upward rush of gas from the well has diminished so as not to interfere with the dropping of the plunger.

It is a further object to then force the valve in the plunger positively to open position so that the plunger may drop rapidly to the lower end of its stroke without interference.

The improvement contemplates the provision of time-limit means to operate automatically and retain the plunger above the fluid outlet with the valve closed until the gaseous fluid has substantially exhausted and then to release the plunger and move the valve therein to open position so that the plunger may drop freely.

In the drawing herewith, Fig. 1 is a side view, partly in central vertical section, of a plunger lift device equipped with our invention. Fig. 2 is a vertical section through the lower end of the device in the well.

Fig. 3 is a vertical section through a valve mechanism employed with the invention.

The plunger lift device upon which our improvement is used is of common construction. It includes the outer casing 1, having thereon the casing head 2, with a lower port 3 into which a pipe 4 is connected, said pipe having a valve 5 therein. The upper end of the casing head 2 is closed by a bonnet 6 fitting about the upper extension 8 of the eduction tube 7 which is threaded therein.

Said extension 8, has thereon a cap 9 enclosing the tubular bumper 11. An opening axially of said cap is connected with the by-pass pipe 12 having therein a choke member 13 of ordinary construction.

Within the casing head is an annular flange 14 upon which is supported the head 15 of the eduction tube 7, which forms a tight fit within the casing head and closes off the passage of fluid. Above this head the eduction tube is perforated at 16 to allow an outlet for the liquid to the chamber 17 from which it flows through a flow line 18, by way of the gate valve 19, to a place of storage, not shown.

The eduction tube 7 extends down to the fluid level and has a strainer plug 20 closing its lower end. Above the plug is a cross-shaped stop member 21 against which the plunger valve stem may engage to close said valve.

The plunger is shown at the upper end of its stroke. It includes a body 22 and a supporting head 23 for the valve 24. Said valve closes upwardly into a seat in the body. The stem 25 of the valve projects below the head and may contact with the stop 21, as previously noted.

We form an injector in the flow pipe 18. This includes the T-shaped housing 26 into which the flow line is connected. The upstream flow line section at the housing is constricted in size at 27, and the downstream section has a Venturi passage 28 in said housing 26, whereby the flow of fluid in the flow line will lower the pressure in the housing and also in the by-pass 12 connected to the third branch of the housing. By thus lowering the pressure in the by-pass 12, we exert a suction at the upper end of the eduction tube tending to hold the plunger in its upper position while the fluid is flowing with sufficient force through the flow line to maintain a substantial reduction in pressure.

To release the plunger and open the valve therein, we provide a time limit valve shown at 29 within an auxiliary line 30 connected at 30a to the pipe 3 and at 31 to the by-pass line 12.

The construction of this valve is disclosed in Fig. 3. It is formed by a cross having an inlet 32 and an outlet 33. One arm of the cross is closed at 34, and the opposed opening is closed by a plug 35 formed at the lower end of a cylindrical chamber 36 and through which the valve stem 37 is slidable.

The passage through the housing is closed by a valve controlled partition 38 having upper and lower seats 39 and 40 respectively. A valve 41 mounted upon the stem 37 is adapted to close the ports through the valve seats as will be understood from the drawing. As will be noted, the valve stem allows a small play of the valve member thereon between a shoulder 42 and the enlarged lower end 43 of the stem. A spring 44 compressed between the valve head and the plug 35 tends to hold the valve normally seated.

The chamber 36 is closed by a cap 45 on the under side of which is tightly secured by welding or other similar means, a bellows-shaped packing element 46. This packing element has its lower end sealed about the valve stem at 47. This type of packing member is old in the art. It is resilient and allows the longitudinal movement of the valve stem against the pressure of a spring 48 within the packing member. There are two fluid conducting lines connected with the chamber 36; a high pressure line 49, and a low pressure line 50. The high pressure line is connected at its other end to the flow line 18 adjacent the casing. The low pressure line connects with the by-pass pipe 12 and the interior of the packing member 46.

The operation of the valve 41 is dampened by a dash pot 51 mounted upon the cap 45. The valve stem 37 projects through the cap 45 into a chamber 52 which is cylindrical and has a piston 53 thereon working in said cylindrical chamber. Above the chamber 52 is a second chamber 54 separated from the chamber 52 by a partition 56 in which is formed a constricted orifice controlled by the manually adjustable needle valve 58. A by-pass from chamber 52 to chamber 54 is provided by a pipe 59 having therein a one way check valve 60.

In the operation of the plunger lift apparatus, thus equipped, the plunger is raised with its load of liquid by the gas below it. At the upper end of its stroke, the plunger forces the liquid out to the flow line 18. The plunger then moves upwardly to the upper end of the extension 8 of the eduction tube. The outlet of fluid through the by-pass 12 will be regulated by the choke valve 13 so that the movement of the plunger will be as slow as desired. The discharge of liquid and gas through the flow line 18 will act through the injector 26 to create a suction tending to hold the plunger at the upper end of the tube 8. When the force of the discharge of fluid through the flow line has been spent, this suction will weaken tending to release the plunger.

The passage through the pipe 30 from the casing to the upper end of the eduction tube will be normally closed by the valve 41. When the discharge of fluid through the flow line occurs, however, the pressure of fluid in line 49 will increase and in line 50, the pressure will decrease because of the ejector member 26. As a result, the difference of pressure outside and inside the bellows packing member 46 will tend to move the packing member and valve stem upwardly to open the valve 41. This movement will be delayed for a predetermined time, however, by the dash pot, which will allow the piston to move but slowly. The play between the stem and the valve 41 will allow the valve stem to move somewhat before the valve is finally lifted from its seat to allow a discharge of gas from the well into the upper end of the eduction tube, to blow the valve in the plunger open and start the plunger on its downward stroke. The valves and springs will be adjusted so that the valve will not open in the pipe 30 until the gas in the eduction tube has nearly exhausted, so that, when the plunger drops, it will meet with little gas flow resistance.

After the plunger is released the pressures in the high and low pressure lines 49 and 50 will be equalized and the springs 44 and 48 will force the valve 41 to closed position. The by-pass 59 will allow the closing of the valve to be speeded up somewhat through the lack of resistance to the downward movement of the plunger 53 in the dash pot.

By the use of this automatically operating valve we are enabled to make the operation of the plunger 22 more rapid and certain. We are assured that the plunger will not start to drop until the fluid pressure has stopped blowing with force sufficiently strong to hinder the falling of the plunger. Also the valve will be forced open by the rush of gas through pipe 30 and the valve will stay open until it contacts with the stop member at the lower end of its stroke. The effect will be a continuous and smooth operation of the device.

What we claim as new is:

1. A plunger lift device including a well casing, an eduction tube therein, a flow line connected therewith below the upper end thereof, a plunger in said tube movable to the upper end of said tube, a passage connecting said casing and the upper end of said tube, a valve controlled from said flow line in said passage, means operated by the flow of fluid in said line to close said valve, means to open said valve within a predetermined time interval, and means to then direct gaseous fluid into said tube above said plunger to start said plunger downwardly.

2. A plunger lift device including a well casing, an eduction tube therein, projecting above said casing, a plunger movable in said tube from the lower to the upper end thereof, a valve in said plunger, a flow line connected with said casing to receive the liquid from said tube, in combination with a by-pass from said casing to the upper end of said tube, means responsive to the flow of fluid in said flow line to retain said plunger at the upper end of said tube and means to release said plunger and open said valve.

3. A plunger lift device including a well casing, an eduction tube therein, projecting above said casing, a plunger movable in said tube from the lower to the upper end thereof, a valve in said plunger, a flow line connected with said casing to receive the liquid from said tube, in combination with a by-pass from said flow line to the upper end of said tube to retain said plunger at the upper end of said tube and means to release said plunger and open said valve.

4. A plunger lift device including a well casing, an eduction tube therein, projecting above said casing, a plunger movable in said tube from the lower to the upper end thereof, a valve in said plunger, a flow line connected with said casing to receive the liquid from said tube, in combination with a by-pass from said casing to the upper end of said tube, means responsive to the flow of fluid in said flow line to retain said plunger at the upper end of said tube and means in said by-pass connected with said flow line to release said plunger and open said valve.

5. A plunger lift device including a well casing, an eduction tube therein, projecting above said casing, a plunger movable in said tube from the lower to the upper end thereof, a valve in said plunger, a flow line connected with said casing to receive the liquid from said tube, in combination with a by-pass from said casing to the upper end of said tube, means responsive to the flow of fluid in said flow line to retain said plunger at the upper end of said tube and means including a valve normally closing said by-pass, but adapted to open in response to the flow of fluid in said flow line and allow passage of fluid to release said plunger and open said valve in said plunger.

6. A plunger lift device including a well casing, an eduction tube extending upwardly through and above said casing, a casing head forming a seal about said tube, a flow line on said casing head, outlets from said tube to said flow line, an injector in said flow line connected with said tube to reduce the fluid pressure at the upper end thereof, a plunger in said tube, a by-pass from said casing to the upper end of said tube, means normally closing said by-pass, but opening in response to the flow of fluid in said flow line, and means to delay the opening of said closing means.

7. A plunger lift device including a well casing, an eduction tube extending upwardly through and above said casing, a casing head forming a seal about said tube, a flow line on said casing head, outlets from said tube to said flow line, an injector in said flow line connected with said tube to reduce the fluid pressure at the upper end thereof, a plunger in said tube, a by-pass from said casing to the upper end of said tube, a valve normally closing said by-pass, fluid pressure operated means to open said valve connected with said flow line, and means to delay the opening of said valve for a predetermined time interval.

8. In a plunger lift device including a well casing, a casing head closing the upper end thereof, an eduction tube extending through said casing head and above the same, a flow line receiving fluid from said eduction tube and said casing head, a plunger operated by pneumatic pressure in said tube, in combination with means to reduce the fluid pressure above said plunger at the upper end of said tube while fluid is flowing in said flow line and means to then increase the pressure above said plunger to move said plunger downwardly.

9. In a plunger lift device including a well casing, a casing head closing the upper end thereof, an eduction tube extending through said casing head and above the same, a flow line receiving fluid from said eduction tube and said casing head, a plunger operated by pneumatic pressure in said tube, in combination with means to reduce the fluid pressure above said plunger at the upper end of said tube while fluid is flowing in said flow line and means to then increase the pressure above said plunger to move said plunger downwardly both the said pressure reducing and the pressure increasing means operating in response to the flow of fluid in said flow line.

HAROLD W. FLETCHER.
RALPH P. SHERMAN.